United States Patent
Ramesh et al.

(10) Patent No.: US 11,769,169 B2
(45) Date of Patent: *Sep. 26, 2023

(54) METHOD, SYSTEM, AND COMPUTER PROGRAM PRODUCT FOR PROCESSING A TRANSACTION INITIATED USING AN ELECTRONIC WALLET

(71) Applicant: Visa International Service Association, San Francisco, CA (US)

(72) Inventors: Shankara Narayanan Ramesh, Singapore (SG); Vidhya Athanoor Lakshmi Narayanan, Singapore (SG); Purnachandra Reddy Motati, Singapore (SG); Arulmurugan Chinnasamy, Singapore (SG); Pradeep Damitha Senanayake, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,663

(22) Filed: Dec. 20, 2022

(65) Prior Publication Data

US 2023/0121201 A1    Apr. 20, 2023

Related U.S. Application Data

(63) Continuation of application No. 17/698,296, filed on Mar. 18, 2022, now Pat. No. 11,562,391, which is a
(Continued)

(51) Int. Cl.
*G06Q 30/00*    (2023.01)
*G06Q 30/0226*    (2023.01)
*G06Q 20/36*    (2012.01)

(52) U.S. Cl.
CPC ......... *G06Q 30/0233* (2013.01); *G06Q 20/36* (2013.01)

(58) Field of Classification Search
None
See application file for complete search history.

(56) References Cited

U.S. PATENT DOCUMENTS 7,680,688 B2    3/2010    Hessburg et al.
8,332,290 B1    12/2012    Venturo et al.
(Continued)

FOREIGN PATENT DOCUMENTS

AU    2012209213 B2    5/2016
WO    2012054786 A1    4/2012
WO    2012112822 A2    8/2012

OTHER PUBLICATIONS

Arnfield, Robin. "Mobile Wallets 101." Retrieved Sep. 15, 2015: 2015. (Year: 2015).
(Continued)

*Primary Examiner* — Michael Bekerman
(74) *Attorney, Agent, or Firm* — THE WEBB LAW FIRM

(57) ABSTRACT

A method for processing a transaction initiated using an electronic wallet application may include storing a virtual payment device configured to initiate a transaction. A rewards inquiry may be communicated to an issuer. A rewards inquiry response may be received from the issuer containing a rewards amount associated with the virtual payment device. The rewards amount may be displayed. A transaction may be initiated with a merchant using the virtual payment device. A redemption request may be communicated to the issuer. A redemption response including an updated rewards amount may be received from the issuer and include a difference between the rewards amount and the
(Continued)

rewards amount applied toward the transaction. A system and computer program product are also disclosed.

20 Claims, 11 Drawing Sheets

Related U.S. Application Data continuation of application No. 16/375,247, filed on Apr. 4, 2019, now Pat. No. 11,328,316.

(56) References Cited

U.S. PATENT DOCUMENTS

| | | | |
|---|---|---|---|
| 10,223,708 | B2 | 3/2019 | Pirillo |
| 10,885,541 | B1 | 1/2021 | Ho |
| 2003/0236704 | A1 | 12/2003 | Antonucci |
| 2009/0106112 | A1 | 4/2009 | Dalmia et al. |
| 2011/0060629 | A1 | 3/2011 | Yoder et al. |
| 2013/0325569 | A1 | 12/2013 | Holmes et al. |
| 2014/0052617 | A1 | 2/2014 | Chawla et al. |
| 2014/0108120 | A1 | 4/2014 | Pirillo |
| 2014/0188586 | A1 | 7/2014 | Carpenter et al. |
| 2015/0120429 | A1 | 4/2015 | Salmon et al. |
| 2015/0149271 | A1 | 5/2015 | Battle et al. |
| 2016/0012465 | A1 | 1/2016 | Sharp |
| 2017/0132653 | A1 | 5/2017 | Venugopalan et al. |
| 2018/0285916 | A1 | 10/2018 | Althauser et al. |
| 2019/0057412 | A1 | 2/2019 | Bhattacharjee et al. |
| 2019/0355005 | A1 | 11/2019 | Kappagantu et al. |

OTHER PUBLICATIONS

Cox, Christopher, and Scott Sanchez. "Transforming the Customer Experience: The Promise of Mobile Wallets." First Data Corporation (2012). (Year: 2012).

Dorotic, Matilda, et al. "Reward redemption effects in a loyalty program when customers choose how much and when to redeem." International Journal of Research in Marketing 31.4 (2014): 339-355. (Year: 2014).

Mjolsnes, Stig Frode, and Chunming Rong. "On-line e-wallet system with decentralized credential keepers." Mobile Networks and Applications 8.1 (2003): 87-99. (Year: 2003).

METHOD, SYSTEM, AND COMPUTER PROGRAM PRODUCT FOR PROCESSING A TRANSACTION INITIATED USING AN ELECTRONIC WALLET

CROSS-REFERENCE TO RELATED APPLICATION

The present application is a continuation of U.S. patent application Ser. No. 17/698,296, filed Mar. 18, 2022, which is a continuation of U.S. patent application Ser. No. 16/375,247, filed Apr. 4, 2019, now U.S. Pat. No. 11,328,316, the disclosures of which are hereby incorporated by reference in their entireties.

BACKGROUND

1. Field

The disclosure relates to electronic wallets and, in some non-limiting embodiments or aspects, to a method, system, and computer program product for processing a transaction initiated using an electronic wallet.

2. Technical Considerations

Certain consumers may carry multiple payment devices (e.g., credit cards and/or debit cards) in order to initiate transactions with merchants accepting such forms of payment. The payment devices held by the consumer may have been issued by the same or different issuer institutions. The account data for these payment devices may be stored in the consumer's electronic wallet, which may be an application on their mobile device (e.g., a smartphone or tablet) and/or a server. Electronic wallets may reduce the need to carry the physical payment device and provide convenience at the point of sale by initiating transactions using the mobile device.

However, electronic wallets may not enable users to efficiently redeem rewards earned using their various payment devices. For example, some issuers of the payment devices may integrate with some individual merchants to enable rewards redemption at the respective merchants; however, issuers are not integrated with all merchants. As a result, the user is not able to redeem earned rewards with all merchants, but only those select merchants with which the issuer is integrated.

SUMMARY

Accordingly, and generally, provided is an improved method, system, and computer program product for processing a transaction initiated using an electronic wallet application.

According to some non-limiting embodiments or aspects, a method for processing a transaction initiated using an electronic wallet application includes: storing, in an electronic wallet application of a user device of a user, at least one virtual payment device associated with a payment device issued to the user by an issuer system, the at least one virtual payment device configured to initiate at least one of a debit and credit transaction; communicating, from the user device by the electronic wallet application, a rewards inquiry to an issuer system of the issuer; receiving, at the user device by the electronic wallet application, a rewards inquiry response from the issuer system, the rewards inquiry response containing a rewards amount associated with the at least one virtual payment device; displaying, in the electronic wallet application of the user device, the rewards amount associated with the at least one virtual payment device; initiating, with the user device by the electronic wallet application, a debit or credit transaction for a transaction amount with a merchant system using the at least one virtual payment device; communicating, from the user device by the electronic wallet application, a redemption request to the issuer system, where the redemption request specifies at least a portion of the rewards amount to be applied to the debit or credit transaction; and receiving, at the user device by the electronic wallet application, a redemption response including an updated rewards amount from the issuer system, where the updated rewards amount includes a difference between the rewards amount and the at least the portion of the rewards amount applied toward the debit or credit transaction.

In some non-limiting embodiments or aspects, the method may further include receiving, at the user device by the electronic wallet application, an input indicating that the debit or credit transaction is to be processed using at least a portion of the rewards amount. Communicating the rewards inquiry to the issuer system may include communicating, from the user device by the electronic wallet application, a first rewards inquiry to a transaction service provider system of a transaction service provider associated with the at least one virtual payment device according to a first application programming interface, where the first rewards inquiry may cause the transaction service provider system to generate and communicate a second rewards inquiry to the issuer system according to a second application programming interface. The at least one virtual payment device may be stored in the electronic wallet application as a token, where the token may be different from an account identifier assigned by the issuer system to the payment device. The first rewards inquiry may include the token and the second rewards inquiry may include the account identifier, where generating the second rewards inquiry may include replacing the token of the first rewards inquiry with the account identifier to form the second rewards inquiry. The method may further include receiving, in the electronic wallet application of the user device, the at least one virtual payment device from a transaction service provider system associated with the at least one virtual payment device before storing the at least one virtual payment device in the electronic wallet application of the user device. The issuer system may credit an account of the user with the at least the portion of the rewards amount to be applied to the debit or credit transaction during settlement of the debit or credit transaction.

According to some non-limiting embodiments or aspects, a system for processing a transaction initiated using an electronic wallet application includes at least one processor programmed or configured to: store, in an electronic wallet application, at least one virtual payment device associated with a payment device issued to the user by an issuer system, the at least one virtual payment device configured to initiate at least one of a debit and credit transaction; communicate, by the electronic wallet application, a rewards inquiry to an issuer system of the issuer; receive, by the electronic wallet application, a rewards inquiry response from the issuer system, the rewards inquiry response containing a rewards amount associated with the at least one virtual payment device; display, in the electronic wallet application, the rewards amount associated with the at least one virtual payment device; initiate, by the electronic wallet application, a debit or credit transaction for a transaction amount with a merchant system using the at least one virtual payment device; communicate, by the electronic wallet application, a redemption request to the issuer system, where the redemption request specifies at least a portion of the rewards amount to be applied to the debit or credit transaction; and receive, by the electronic wallet application, a redemption response including an updated rewards amount from the issuer system, where the updated rewards amount includes a difference between the rewards amount and the at least the portion of the rewards amount applied toward the debit or credit transaction.

In some non-limiting embodiments or aspects, the at least one processor may be further programmed or configured to: receive, by the electronic wallet application, an input indicating that the debit or credit transaction is to be processed using at least a portion of the rewards amount. Communicating the rewards inquiry to the issuer system may include the at least one processor: communicating, by the electronic wallet application, a first rewards inquiry to a transaction service provider system of a transaction service provider associated with the at least one virtual payment device according to a first application programming interface, where the first rewards inquiry may cause the transaction service provider system to generate and communicate a second rewards inquiry to the issuer system according to a second application programming interface. The at least one virtual payment device may be stored in the electronic wallet application as a token, where the token may be different from an account identifier assigned by the issuer system to the payment device. The first rewards inquiry may include the token and the second rewards inquiry may include the account identifier, where generating the second rewards inquiry may include replacing the token of the first rewards inquiry with the account identifier to form the second rewards inquiry. The at least one processor may be further programmed or configured to receive, in the electronic wallet application, the at least one virtual payment device from a transaction service provider system associated with the at least one virtual payment device before storing the at least one virtual payment device in the electronic wallet application. The redemption request may cause the issuer system to credit an account of the user with the at least the portion of the rewards amount to be applied to the debit or credit transaction during settlement of the debit or credit transaction.

According to some non-limiting embodiments or aspects, a computer program product for processing a transaction initiated using an electronic wallet application includes at least one non-transitory computer-readable medium including one or more instructions that, when executed by at least one processor, cause the at least one processor to: store, in an electronic wallet application, at least one virtual payment device associated with a payment device issued to the user by an issuer system, the at least one virtual payment device configured to initiate at least one of a debit and credit transaction; communicate, by the electronic wallet application, a rewards inquiry to an issuer system of the issuer; receive, by the electronic wallet application, a rewards inquiry response from the issuer system, the rewards inquiry response containing a rewards amount associated with the at least one virtual payment device; display, in the electronic wallet application, the rewards amount associated with the at least one virtual payment device; initiate, by the electronic wallet application, a debit or credit transaction for a transaction amount with a merchant system using the at least one virtual payment device; communicate, by the electronic wallet application, a redemption request to the issuer system, where the redemption request specifies at least a portion of the rewards amount to be applied to the debit or credit transaction; and receive, by the electronic wallet application, a redemption response including an updated rewards amount from the issuer system, where the updated rewards amount includes a difference between the rewards amount and the at least the portion of the rewards amount applied toward the debit or credit transaction.

In some non-limiting embodiments or aspects, the one or more instructions may further cause the at least one processor to: receive, by the electronic wallet application, an input indicating that the debit or credit transaction is to be processed using at least a portion of the rewards amount. Communicating the rewards inquiry to the issuer system may include the at least one processor: communicating, by the electronic wallet application, a first rewards inquiry to a transaction service provider system of a transaction service provider associated with the at least one virtual payment device according to a first application programming interface, where the first rewards inquiry may cause the transaction service provider system to generate and communicate a second rewards inquiry to the issuer system according to a second application programming interface. The at least one virtual payment device may be stored in the electronic wallet application as a token, where the token may be different from an account identifier assigned by the issuer system to the payment device. The first rewards inquiry may include the token and the second rewards inquiry may include the account identifier, where generating the second rewards inquiry may include replacing the token of the first rewards inquiry with the account identifier to form the second rewards inquiry. The one or more instructions may further cause the at least one processor to receive, in the electronic wallet application, the at least one virtual payment device from a transaction service provider system associated with the at least one virtual payment device before storing the at least one virtual payment device in the electronic wallet application. The redemption request may cause the issuer system to credit an account of the user with the at least the portion of the rewards amount to be applied to the debit or credit transaction during settlement of the debit or credit transaction.

Further embodiments or aspects are set forth in the following numbered clauses:

Clause 1: A method for processing a transaction initiated using an electronic wallet application, comprising: storing, in an electronic wallet application of a user device of a user, at least one virtual payment device associated with a payment device issued to the user by an issuer system, the at least one virtual payment device configured to initiate at least one of a debit and credit transaction; communicating, from the user device by the electronic wallet application, a rewards inquiry to an issuer system of the issuer; receiving, at the user device by the electronic wallet application, a rewards inquiry response from the issuer system, the rewards inquiry response containing a rewards amount associated with the at least one virtual payment device; displaying, in the electronic wallet application of the user device, the rewards amount associated with the at least one virtual payment device; initiating, with the user device by the electronic wallet application, a debit or credit transaction for a transaction amount with a merchant system using the at least one virtual payment device; communicating, from the user device by the electronic wallet application, a redemption request to the issuer system, wherein the redemption request specifies at least a portion of the rewards amount to be applied to the debit or credit transaction; and receiving, at the user device by the electronic wallet application, a redemption response comprising an updated rewards amount from the issuer system, wherein the updated rewards amount comprises a difference between the rewards amount and the at least the portion of the rewards amount applied toward the debit or credit transaction.

Clause 2: The method of clause 1, further comprising: receiving, at the user device by the electronic wallet application, an input indicating that the debit or credit transaction is to be processed using at least a portion of the rewards amount.

Clause 3: The method of clause 1 or clause 2, wherein communicating the rewards inquiry to the issuer system comprises: communicating, from the user device by the electronic wallet application, a first rewards inquiry to a transaction service provider system of a transaction service provider associated with the at least one virtual payment device according to a first application programming interface, wherein the first rewards inquiry causes the transaction service provider system to generate and communicate a second rewards inquiry to the issuer system according to a second application programming interface.

Clause 4: The method of any of clauses 1-3, wherein the at least one virtual payment device is stored in the electronic wallet application as a token, wherein the token is different from an account identifier assigned by the issuer system to the payment device.

Clause 5: The method of any of clauses 1-4, wherein the first rewards inquiry comprises the token and the second rewards inquiry comprises the account identifier, wherein generating the second rewards inquiry comprises replacing the token of the first rewards inquiry with the account identifier to form the second rewards inquiry.

Clause 6: The method of any of clauses 1-5, further comprising receiving, in the electronic wallet application of the user device, the at least one virtual payment device from a transaction service provider system associated with the at least one virtual payment device before storing the at least one virtual payment device in the electronic wallet application of the user device.

Clause 7: The method of any of clauses 1-6, wherein the issuer system credits an account of the user with the at least the portion of the rewards amount to be applied to the debit or credit transaction during settlement of the debit or credit transaction.

Clause 8: A system for processing a transaction initiated using an electronic wallet application, comprising at least one processor programmed or configured to: store, in an electronic wallet application, at least one virtual payment device associated with a payment device issued to the user by an issuer system, the at least one virtual payment device configured to initiate at least one of a debit and credit transaction; communicate, by the electronic wallet application, a rewards inquiry to an issuer system of the issuer; receive, by the electronic wallet application, a rewards inquiry response from the issuer system, the rewards inquiry response containing a rewards amount associated with the at least one virtual payment device; display, in the electronic wallet application, the rewards amount associated with the at least one virtual payment device; initiate, by the electronic wallet application, a debit or credit transaction for a transaction amount with a merchant system using the at least one virtual payment device; communicate, by the electronic wallet application, a redemption request to the issuer system, wherein the redemption request specifies at least a portion of the rewards amount to be applied to the debit or credit transaction; and receive, by the electronic wallet application, a redemption response comprising an updated rewards amount from the issuer system, wherein the updated rewards amount comprises a difference between the rewards amount and the at least the portion of the rewards amount applied toward the debit or credit transaction.

Clause 9: The system of clause 8, wherein the at least one processor is further programmed or configured to: receive, by the electronic wallet application, an input indicating that the debit or credit transaction is to be processed using at least a portion of the rewards amount.

Clause 10: The system of clause 8 or clause 9, wherein communicating the rewards inquiry to the issuer system comprises the at least one processor: communicating, by the electronic wallet application, a first rewards inquiry to a transaction service provider system of a transaction service provider associated with the at least one virtual payment device according to a first application programming interface, wherein the first rewards inquiry causes the transaction service provider system to generate and communicate a second rewards inquiry to the issuer system according to a second application programming interface.

Clause 11: The system of any of clauses 8-10, wherein the at least one virtual payment device is stored in the electronic wallet application as a token, wherein the token is different from an account identifier assigned by the issuer system to the payment device.

Clause 12: The system of any of clauses 8-11, wherein the first rewards inquiry comprises the token and the second rewards inquiry comprises the account identifier, wherein generating the second rewards inquiry comprises replacing the token of the first rewards inquiry with the account identifier to form the second rewards inquiry.

Clause 13: The system of any of clauses 8-12, wherein the at least one processor is further programmed or configured to receive, in the electronic wallet application, the at least one virtual payment device from a transaction service provider system associated with the at least one virtual payment device before storing the at least one virtual payment device in the electronic wallet application.

Clause 14: The system of any of clauses 8-13, wherein the redemption request causes the issuer system to credit an account of the user with the at least the portion of the rewards amount to be applied to the debit or credit transaction during settlement of the debit or credit transaction.

Clause 15: A computer program product for processing a transaction initiated using an electronic wallet application, the computer program product comprising at least one non-transitory computer-readable medium including one or more instructions that, when executed by at least one processor, cause the at least one processor to: store, in an electronic wallet application, at least one virtual payment device associated with a payment device issued to a user by an issuer system, the at least one virtual payment device configured to initiate at least one of a debit and credit transaction; communicate, by the electronic wallet application, a rewards inquiry to an issuer system of the issuer; receive, by the electronic wallet application, a rewards inquiry response from the issuer system, the rewards inquiry response containing a rewards amount associated with the at least one virtual payment device; display, in the electronic wallet application, the rewards amount associated with the at least one virtual payment device; initiate, by the electronic wallet application, a debit or credit transaction for a transaction amount with a merchant system using the at least one virtual payment device; communicate, by the electronic wallet application, a redemption request to the issuer system, wherein the redemption request specifies at least a portion of the rewards amount to be applied to the debit or credit transaction; and receive, by the electronic wallet application, a redemption response comprising an updated rewards amount from the issuer system, wherein the updated rewards amount comprises a difference between the rewards amount and the at least the portion of the rewards amount applied toward the debit or credit transaction.

Clause 16: The computer program product of clause 15, wherein the one or more instructions further cause the at least one processor to: receive, by the electronic wallet application, an input indicating that the debit or credit transaction is to be processed using at least a portion of the rewards amount.

Clause 17: The computer program product of clause 15 or clause 16, wherein communicating the rewards inquiry to the issuer system comprises the at least one processor: communicating, by the electronic wallet application, a first rewards inquiry to a transaction service provider system of a transaction service provider associated with the at least one virtual payment device according to a first application programming interface, wherein the first rewards inquiry causes the transaction service provider system to generate and communicate a second rewards inquiry to the issuer system according to a second application programming interface.

Clause 18: The computer program product of any of clauses 15-17, wherein the at least one virtual payment device is stored in the electronic wallet application as a token, wherein the token is different from an account identifier assigned by the issuer system to the payment device.

Clause 19: The computer program product of any of clauses 15-18, wherein the first rewards inquiry comprises the token and the second rewards inquiry comprises the account identifier, wherein generating the second rewards inquiry comprises replacing the token of the first rewards inquiry with the account identifier to form the second rewards inquiry.

Clause 20: The computer program product of any of clauses 15-19, wherein the one or more instructions further cause the at least one processor to receive, in the electronic wallet application, the at least one virtual payment device from a transaction service provider system associated with the at least one virtual payment device before storing the at least one virtual payment device in the electronic wallet application.

Clause 21: The computer program product of any of clauses 15-20, wherein the redemption request causes the issuer system to credit an account of the user with the at least the portion of the rewards amount to be applied to the debit or credit transaction during settlement of the debit or credit transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise. Further, the phrase "based on" is intended to mean "based at least partially on" unless explicitly stated otherwise.

BRIEF DESCRIPTION OF THE DRAWINGS

Additional advantages and details of the disclosure are explained in greater detail below with reference to the non-limiting exemplary embodiments that are illustrated in the accompanying schematic figures, in which.

DETAILED DESCRIPTION

Figure 1:
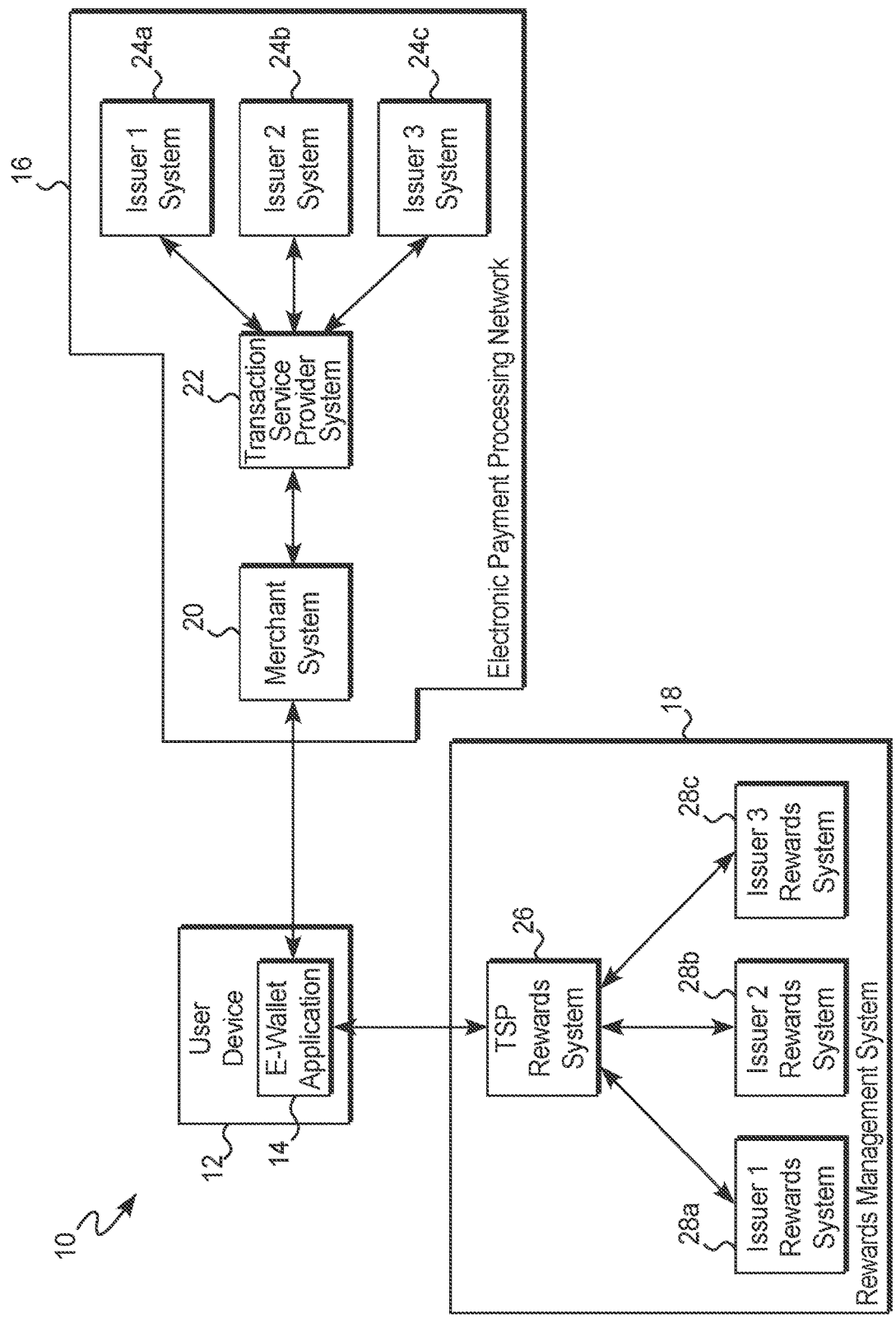
FIG. 1 shows a schematic view of a system for processing a transaction initiated using an electronic wallet application, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "acquirer" may refer to an entity licensed by the transaction service provider and approved by the transaction service provider to originate transactions (e.g., payment transactions) using a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a payment device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the terms "issuer institution," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a payment device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "merchant" may refer to an individual or entity that provides goods and/or services, or access to goods and/or services, to customers based on a transaction, such as a payment transaction. As used herein, the terms "merchant" or "merchant system" may also refer to one or more computer systems operated by or on behalf of a merchant, such as a server computer executing one or more software applications. As used herein, the term "point-of-sale (POS) system," may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a token value may be generated such that the recovery of the original PAN or other account identifier from the token value may not be computationally derived (e.g., with a one-way hash or other cryptographic function). Further, in some non-limiting embodiments, the token format may be configured to allow the entity receiving the payment token to identify it as a payment token and recognize the entity that issued the token.

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments, the token service provider may have the ability to set aside licensed BINs as token BINs to issue tokens for the PANs that may be submitted to the token service provider. In some non-limiting embodiments, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments, the token vault may be a part of a token service system. For example, the token vault may be provided as a part of the token service provider. Additionally or alternatively, the token vault may be a remote repository accessible by the token service provider. In some non-limiting embodiments, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "user interface" or "graphical user interface" refers to a generated display, such as one or more graphical user interfaces (GUIs) with which a user may interact, either directly or indirectly (e.g., through a keyboard, mouse, etc.).

Non-limiting embodiments or aspects of the present disclosure are directed to a method, system, and computer program product for processing a transaction initiated using an electronic wallet application. Non-limiting embodiments or aspects enable a user to efficiently view and redeem rewards points associated with each payment device stored in the electronic wallet. This feature is enabled by the unique system arrangement in which issuers of the payment device integrate with the transaction service providers and the electronic wallet providers via application programming interfaces, as opposed to the issuer integrating with individual merchants, and a non-conventional flow between the electronic wallet, transaction service provider, and issuer(s). Non-limiting embodiments or aspects allow the user to view rewards information associated with the payment device in the electronic wallet. Further, during processing of a payment transaction initiated using a payment device stored in the electronic wallet, the user is able to redeem the rewards associated with that payment device by indicating to the electronic wallet that at least a portion of the rewards amount is to be redeemed. Practically, this allows the user to redeem rewards points associated with the payment device being used to initiate the transaction, regardless of the merchant with whom the transaction is being initiated. Non-limiting embodiments or aspects provide the user with enhanced flexibility for redeeming earned rewards, allowing those rewards to be used more easily and preventing waste (expiration) of earned rewards.

Referring to FIG. 1, a system 10 for processing a transaction initiated using an electronic wallet application according to some non-limiting embodiments or aspects is shown. The system 10 may include a user device 12 of a user (e.g., a consumer engaging in payment transactions with a merchant). The user device 12 may be a client device, such as a smartphone, a tablet computer, and the like. The user device 12 may include an electronic wallet (e-wallet) application 14 downloaded and/or installed on the user device 12. The e-wallet application 14 may allow users to store virtual payment devices associated with physical payment devices (e.g., credit or debit cards) in the e-wallet application 14, such that the e-wallet application 14 allows the user to initiate a payment transaction using the user device 12 by using one of the virtual payment devices stored in the e-wallet application 14 to initiate the payment transaction.

With continued reference to FIG. 1, the user device 12 containing the e-wallet application 14 may initiate a payment transaction using the e-wallet application 14, and that payment transaction may be processed (e.g., authorized cleared, settled) by the user device 12 via the e-wallet application 14 communicating with an electronic payment processing network 16 and a rewards management system 18. The electronic payment processing network 16 may include a merchant system 20 in communication with the e-wallet application 14. The electronic payment processing network 16 may include a transaction service provider system 22 in communication with the merchant system 20 (e.g., directly or via an acquirer system (not pictured)). The electronic payment processing network 16 may include the transaction service provider system 22 in communication with a plurality of issuer systems 24a-24c. The merchant system 20 may be operated by or on behalf of the merchant engaging in the payment transaction with the user. The transaction service provider system 22 may be operated by or on behalf of the transaction service provider associated with the payment device associated with virtual payment device being used to initiate the payment transaction. The issuer systems 24a-24c may be operated by or on behalf of issuers of payment devices, and the transaction service provider system 22 may communicate with the issuer system 24a-24c which issued the payment device associated with virtual payment device used to initiate the payment transaction, in order to process the payment transaction.

The rewards management system 18 may include a transaction service provider (TSP) rewards system 26 in communication with the e-wallet application 14. The TSP rewards system 26 may be operated by or on behalf of a transaction service provider. The TSP rewards system 26 may refer to one or more computer systems operated by or on behalf of a transaction service provider, such as a rewards processing server executing one or more software applications. A rewards processing server may include one or more processors. The TSP rewards system 26 may be the same system as the transaction service provider system 22, or the TSP rewards system 26 may a separate system from the transaction service provider system 22.

The TSP rewards system 26 may be in communication with issuer rewards systems 28a-28c. The issuer rewards systems 28a-28c may be operated by or on behalf of issuers of payment devices, and the TSP rewards system 26 may communicate with the issuer rewards system 28a-28c which issued the payment device associated with virtual payment device used to initiate the payment transaction in order to process the later-described rewards redemption process. The issuer rewards system 28a-28c may refer to one or more computer systems operated by or on behalf of an issuer, such as a rewards processing server executing one or more software applications. The issuer rewards system 28a-28c may be the same system as the corresponding issuer system 24a-24c, or the issuer rewards system 28a-28c may a separate system from the corresponding issuer system 24a-24c.

Figure 2:
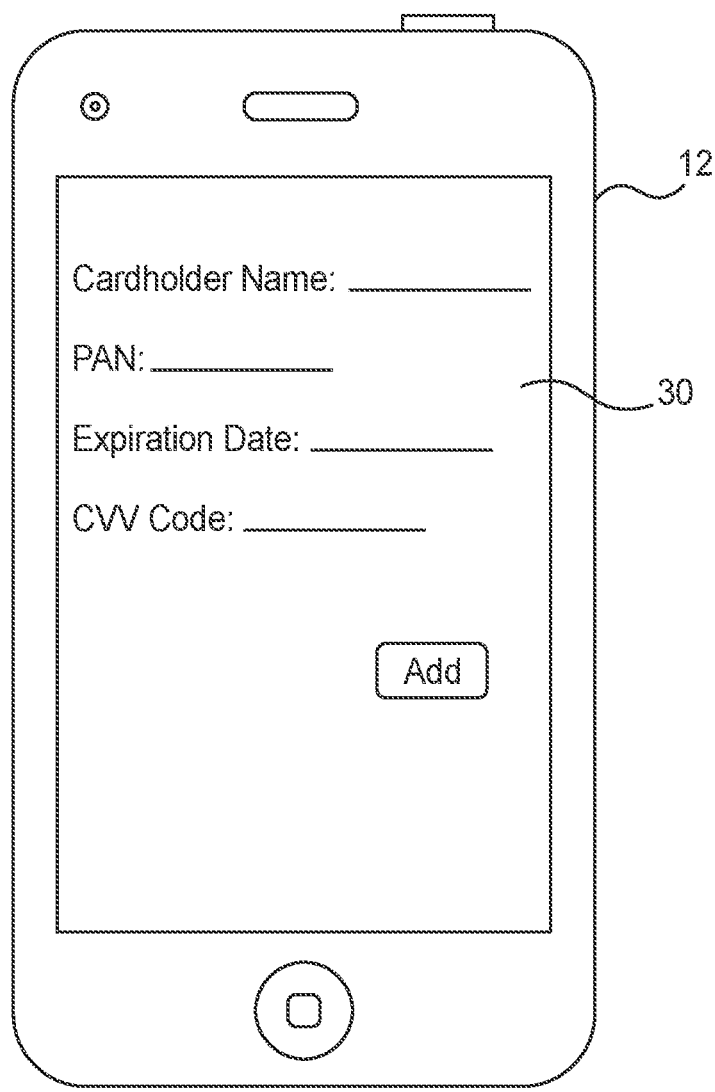
FIG. 2 shows a schematic of a graphical user interface for adding a payment device to an electronic wallet application according to some non-limiting embodiments or aspects.
Figure 3:
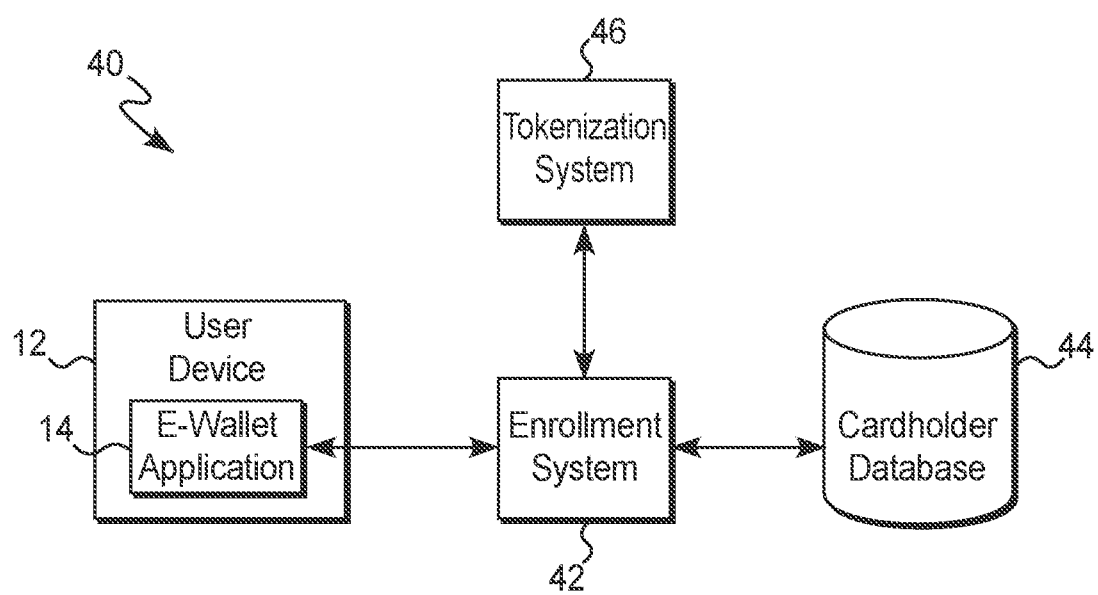
FIG. 3 shows a schematic view of an enrollment environment for adding a payment device to an electronic wallet application, according to some non-limiting embodiments or aspects.

Referring to FIGS. 2 and 3, a user may store at least one virtual payment device associated with a payment device in the e-wallet application 14 to allow the user to initiate payment transactions using their user device 12 using a virtual payment device stored in the e-wallet application 14.

FIG. 2 shows a graphical user interface 30 for adding a payment device to an e-wallet application 14 by storing a virtual payment device, according to some non-limiting embodiments or aspects. By adding the payment device to the e-wallet application 14, the payment device is stored in the e-wallet application 14 as the virtual payment device, which includes certain account information relevant for initiating and processing a payment transaction. Such account information may include, but is not limited to, one or more of the following: cardholder name, PAN (or token associated therewith), expiration date, card verification value (cvv) code, and/or the like. The graphical user interface 30 may include input fields to allow the user to enter the relevant account information into the user device 12 to store the payment device as a virtual payment device in the e-wallet application 14. After entering the relevant account information into the graphical user interface 30, the user may submit the account information to cause the virtual payment device to be stored in the e-wallet application 14. It will be appreciated that any arrangement of the graphical user interface 30 may be used to enter and store virtual payment devices, such as using another arrangement of input fields and selectable options. The user may enter a single payment device or multiple payment devices into the e-wallet application 14.

Referring to FIG. 3, an enrollment environment 40 may include the e-wallet application 14 receiving at least one virtual payment device from an enrollment system 42. The enrollment system 42 may refer to one or more computer systems operated by or on behalf of a transaction service provider (e.g., the same as or part of the transaction service provider system 22, the TSP rewards system 26, and/or the like), issuer (e.g., the same as or part of one of the issuer systems 24a-24c, issuer rewards systems 28a-28c, and/or the like), or other entity, such as a processing server executing one or more software applications. The enrollment system 42 may be operated by or on behalf of the transaction service provider associated with the virtual payment device being received by the e-wallet application 14. In response to receiving the virtual payment device from the enrollment system 42, the e-wallet application 14 may store the virtual payment device. Thus, in addition to or in lieu of the user entering account information associated with a payment device as described in connection with FIG. 2, the enrollment system 42 may communicate the virtual payment device to the e-wallet application 14 to be stored. In some non-limiting embodiments or aspects, virtual payment devices may be stored in the e-wallet application 14 by a combination of the user entering account information associated with a payment device to store a virtual payment device and the e-wallet application 14 receiving at least one virtual payment device from the enrollment system 42. In some non-limiting embodiments or aspects, the user may enter a first payment device into the user device 12 to be stored as a virtual payment device in the e-wallet application 14, and the e-wallet application 14 may communicate with the enrollment system 42 to confirm the virtual payment device (e.g., that the virtual payment device is a valid or active payment device issued to the user) and/or to determine other payment devices associated with the user, such that the user's other payment devices may be stored as virtual payment devices in the e-wallet application 14. The enrollment system 42 may communicate these determined additional virtual payment devices to the e-wallet application 14 for storage. The enrollment system 42 may communicate with a cardholder database 44 to determine additional payment devices associated with the user. The cardholder database 44 may contain information associating cardholders with various payment devices issued thereto.

With continued reference to FIG. 3, in some non-limiting embodiments or aspects, the virtual payment devices may be stored in the e-wallet application 14 as a token different from the account identifier (e.g., PAN) assigned by the issuer system to the payment device. In some non-limiting embodiments or aspects, the e-wallet application 14 may not store the account identifier assigned by the issuer system to the payment device for security purposes.

In some non-limiting embodiments or aspects, the e-wallet application 14 may communicate the user's account information and/or a virtual payment device (including the PAN number thereof) to the enrollment system 42 for tokenization. The enrollment system 42 may communicate the account information and/or the virtual payment device to a tokenization system 46, which may generate a token to be associated with the virtual payment device. The generated token may be communicated to the enrollment system 42. The tokenization system 46 may include a token vault for storing and mapping issued tokens with their associated virtual payment devices. The enrollment system 42 may communicate the generated token to the e-wallet application 14 for storage, in addition to or instead of storing the PAN, and/or other account information.

In some non-limiting embodiments or aspects, the enrollment system 42 may determine payment devices associated with the user by communicating with the cardholder database 44. The enrollment system 42 may communicate the determined payment devices to the tokenization system 46, which may generate a token to be associated with each virtual payment device. The generated tokens may be communicated to the enrollment system 42, which may communicate the tokens to the e-wallet application 14 for storage as the virtual payment devices. The tokenization system 46 may store the generated tokens in the token vault.

Figure 4:
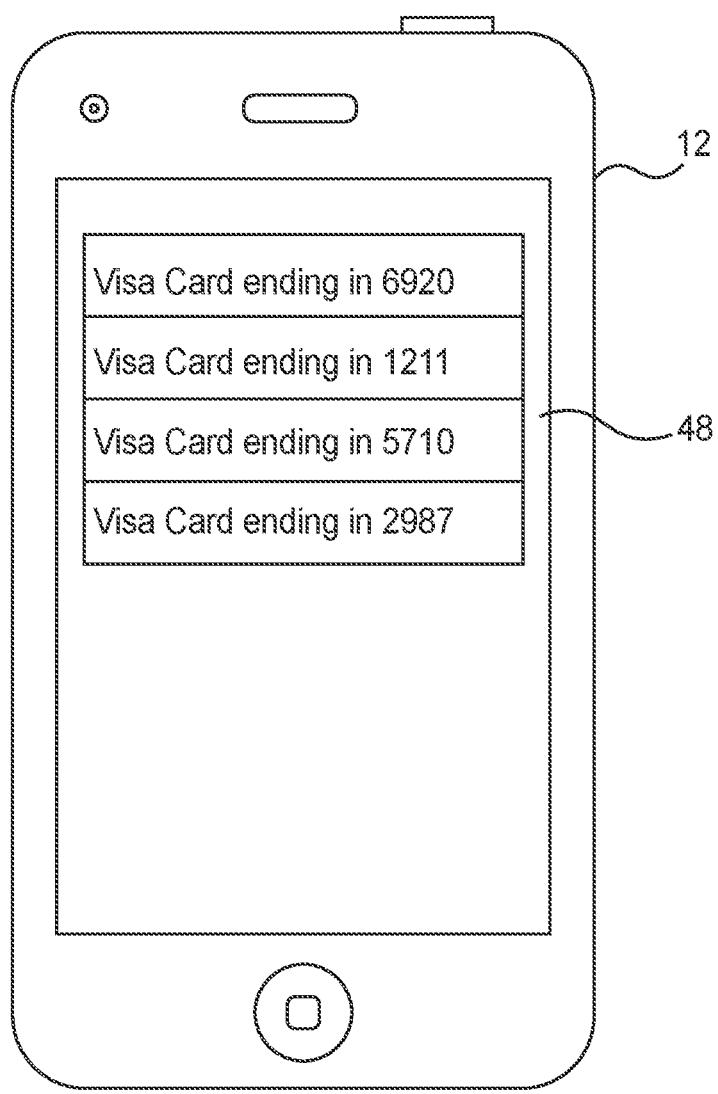
FIG. 4 shows a schematic of a graphical user interface for displaying the payment devices stored in an electronic wallet application, according to some non-limiting embodiments or aspects.

Referring to FIG. 4, a graphical user interface 48 displaying all virtual payment devices stored on the user device 12 in the e-wallet application 14 is shown according to some non-limiting embodiments or aspects. The graphical user interface 48 may list all virtual payment devices stored in the e-wallet application 14 and available to the user to initiate a payment transaction using the user device 12. The user may interact with the graphical user interface 48 to select at least one of the displayed, listed virtual payment devices in order to allow the user to view more information associated with the selected virtual payment device or to allow the user to initiate a payment transaction using the selected virtual payment device. Any number of virtual payment devices may be stored in the e-wallet application 14 and displayed on the graphical user interface 48, and the graphical user interface 48 may include any suitable arrangement of the virtual payment devices.

Figure 5:
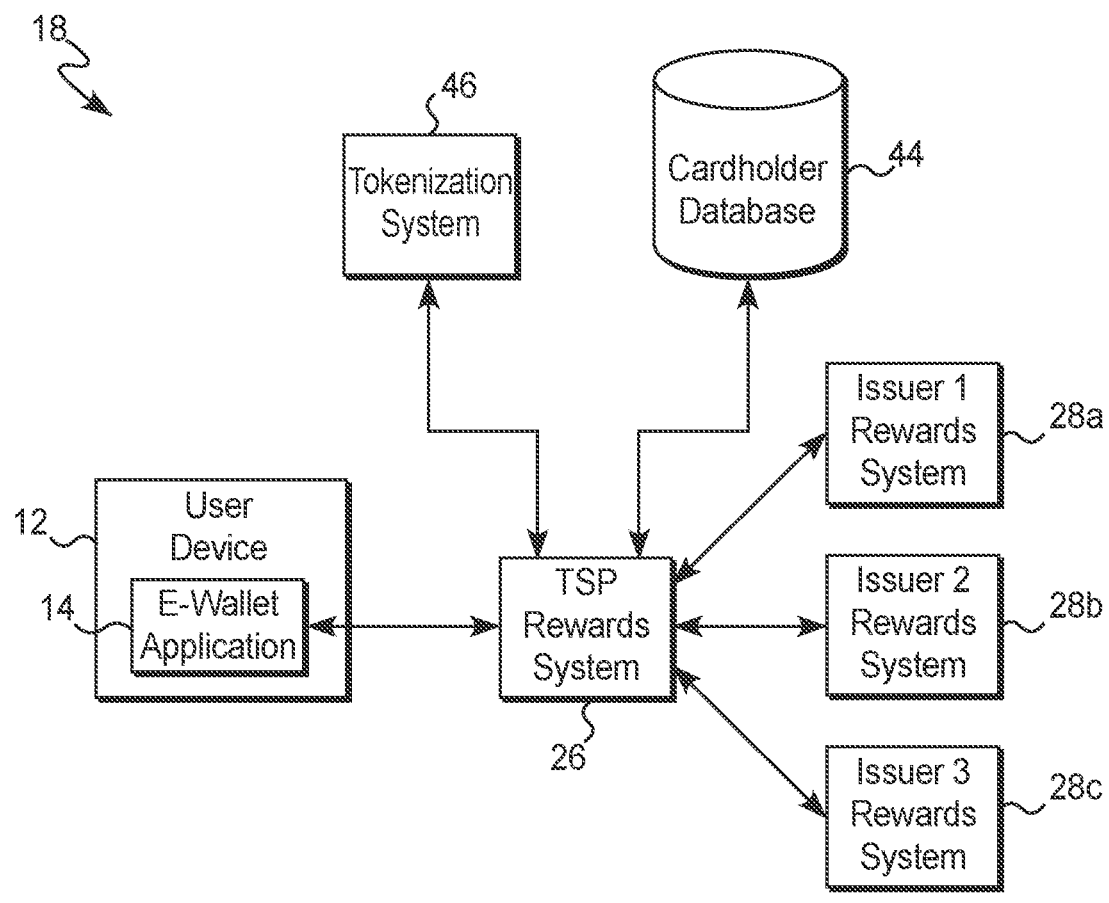
FIG. 5 shows a schematic view of a rewards management system, according to some non-limiting embodiments or aspects.

Referring to FIG. 5, the rewards management system 18 according to some non-limiting embodiments or aspects is shown. The rewards management system 26 may process rewards inquiries. A rewards inquiry may include a request from the user device 12 via the e-wallet application 14 requesting rewards information associated with at least one virtual payment device stored in the e-wallet application 14. The rewards inquiry may be initiated by the user selecting a virtual payment device in the e-wallet application 14 (such as via the graphical user interface 48 shown in FIG. 4). The user device 14 may communicate a first rewards inquiry associated with a virtual payment device to the TSP rewards system 26. The first rewards inquiry may be communicated from user device 12 via the e-wallet application 14 to the TSP rewards system 26 according to a first application programming interface as described herein. The first rewards inquiry may cause the TPS rewards system 26 to generate and communicate a second rewards inquiry to the relevant issuer rewards system 28a-28c (e.g., the issuer rewards system of the issuer that issued the payment device associated with the virtual payment device) according to a second application programming interface, as described herein. The first rewards inquiry may include account information, the PAN, the token, and/or the like associated with the virtual payment device.

In response to receiving the first rewards inquiry, the TSP rewards system 26 may determine the issuer associated with the virtual payment device (e.g., the issuer who issued the payment device associated with the virtual payment device to the user). This determination may be made by the TSP rewards system 26 communicating with the cardholder database 44, which may include information associating users with various payment devices and the issuers issuing those payment devices. In response to determining the issuer associated with the virtual payment device, the TSP rewards system 26 may communicate a second rewards inquiry including the first rewards inquiry, at least in part, to the relevant issuer rewards system 28a-28c. The relevant rewards system 28a-28c may respond by communicating a rewards inquiry response to the TSP rewards system 26, the rewards inquiry response including rewards information associated with the virtual payment device associated with the first rewards inquiry. The rewards information may include, but is not limited to, at least one of a rewards amount (e.g., a monetary currency, a rewards currency (e.g., rewards points, airline miles, and the like), a cryptocurrency, or other type of currency), a conversion amount of rewards (e.g., from a rewards currency to a monetary currency, between rewards currencies, or between monetary currencies, or any other type of currency exchange, including currency exchanges including cryptocurrencies), an expiration date associated with the rewards amount, and the like. The TSP rewards system 26 may communicate the rewards inquiry response including the rewards information to the e-wallet application 14 of the user device 12. The e-wallet application 14 may display the rewards amount and/or other rewards information associated with virtual payment device.

With continued reference to FIG. 5, in some non-limiting embodiments or aspects, the first rewards inquiry from the e-wallet application 14 to the TSP rewards system 26 may include the token associated with the virtual payment device associated with the rewards inquiry (e.g., because the e-wallet application 14 has not stored the PAN associated with the payment device and/or stored the token in lieu of the PAN). In response to receiving the token in the first rewards inquiry, the TSP rewards system 26 may communicate with the tokenization system 46 to receive the account identifier (stored in the token vault and associated with the token) assigned by the issuer (such as the PAN) associated with the virtual payment device based on the account identifier. The TSP rewards system 26 may communicate with the cardholder database 44 to determine the issuer of the virtual payment device. The TSP rewards system 26 may communicate the second rewards inquiry, which may include the account identifier assigned by the issuer in addition to or in lieu of the token to the relevant issuer rewards system 28a-28c. The token from the first rewards inquiry may be replaced by the account identifier assigned by the issuer in the second rewards inquiry.

Figure 6:
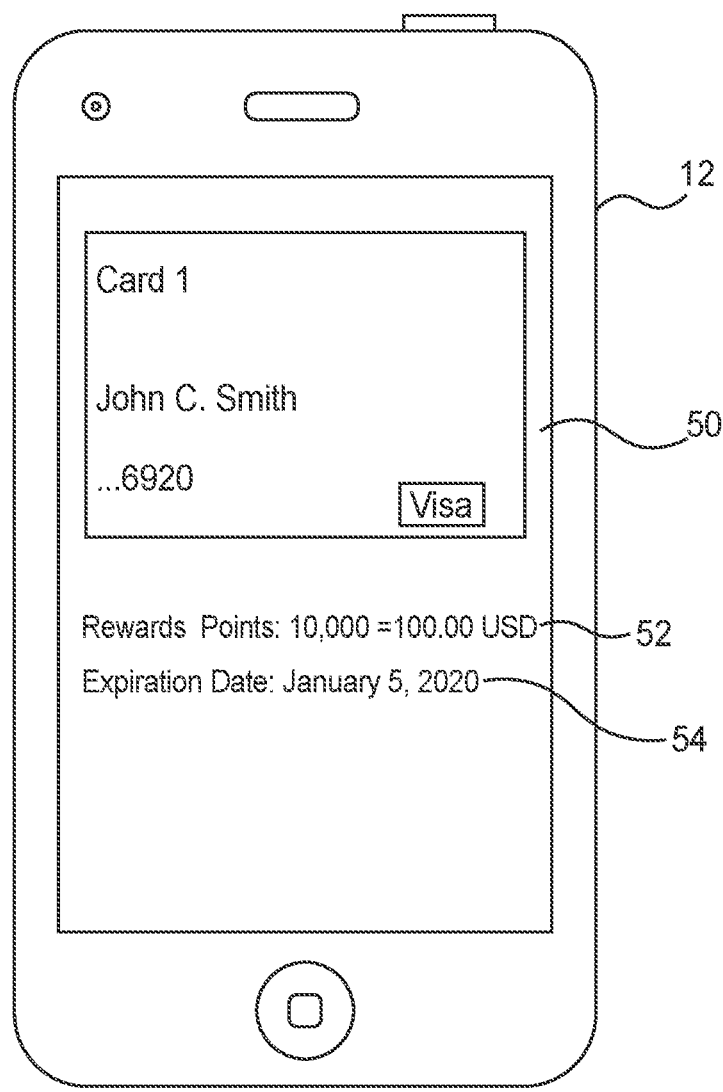
FIG. 6 shows a schematic of a graphical user interface for displaying virtual payment device information in an electronic wallet application, according to some non-limiting embodiments or aspects.

Referring to FIG. 6 a graphical user interface 50 for displaying virtual payment device information in an electronic wallet application according to some non-limiting embodiments or aspects is shown. The graphical user interface 50 may display at least some of the rewards information received in response to the rewards inquiry. As shown in FIG. 6, the rewards amount 52 associated with the virtual payment device may be displayed, including an amount in monetary currency (e.g., US dollars) corresponding to the rewards amount. As shown in FIG. 6, an expiration date 54 associated with the rewards amount 52 may be displayed. Such information may be displayed for each virtual payment device stored in the e-wallet application 14 based on rewards information received in response to a rewards inquiry communicated in association with each virtual rewards card. The graphical user interface 50 for displaying virtual payment device information, including rewards information, may use any suitable arrangement for displaying the virtual payment device and its associated rewards information.

Referring again to FIG. 1, the user may initiate a payment transaction with a merchant using the user device 12 via the e-wallet application 14. The payment transaction may include a credit transaction, debit transaction, and/or the like. The payment transaction may be initiated using at least one of the virtual payment devices stored in the e-wallet application 14. The user may initiate the payment transaction via the e-wallet application 14 by communicating with the merchant system 20 (e.g., the merchant's point-of-sale (POS) system). For example, user device 12 may communicate with a POS system by at least one of one or more card readers, near-field communication (NFC) receivers, RFID receivers, and/or other contactless transceivers or receivers, contact-based receivers, payment terminals, computers, servers, input devices, and/or other like devices that can be used to initiate a payment transaction In response, the merchant system 20 may initiate processing of the payment transaction by communicating a transaction message (e.g., first authorization request) to the transaction service provider system 22 (e.g., directly or via an acquirer). The transaction message may include account information associated with the virtual payment device (e.g., PAN or token associate therewith, cardholder name, expiration date, cvv code, and/or the like) selected by the user to initiate the payment transaction, as well as other information relevant for processing the payment transaction, e.g., merchant information, transaction amount, goods and/or services purchased, and/or the like. The transaction service provider system 22 may communicate at least a portion of the transaction message (e.g., a second authorization request including at least a portion of the transaction message) to the relevant issuer system 24a-24c (e.g., the issuer system of the issuer which issued the virtual payment device to the user).

In response to receiving the second authorization request, the issuer system 24a-24c may determine an authorization decision associated with the payment transaction. The authorization decision may be, but is not limited to, at least one of: to approve the payment transaction, to decline the payment transaction, and/or the like to approve the payment transaction in part and decline the payment transaction in part. The issuer system 24a-24c may communicate an authorization response (e.g., first authorization response) including the authorization decision to the transaction service provider system 22. The transaction service provider system 22 may communicate a transaction response (e.g., the first authorization response, a second authorization response based on the first authorization response, and/or the like) including the authorization decision to the merchant system 20. Additionally, the merchant system 20 may communicate the authorization decision to the user device 12 (e.g., the e-wallet application 14 thereof).

With continued reference to FIG. 1, before, during, or after processing or authorization of the payment transaction in the electronic payment processing network 16 as described above, and in response to the user initiating the payment transaction with a merchant, the user device 12, via the e-wallet application 14, may communicate a redemption request specifying that at least a portion of the rewards amount associated with the virtual payment device used to initiate the payment transaction is to be applied to the payment transaction. The redemption request may be communicated from the e-wallet application 14 to the rewards management system 18 for processing, such as by communicating the redemption request to the TSP rewards system 26.

Figure 7:
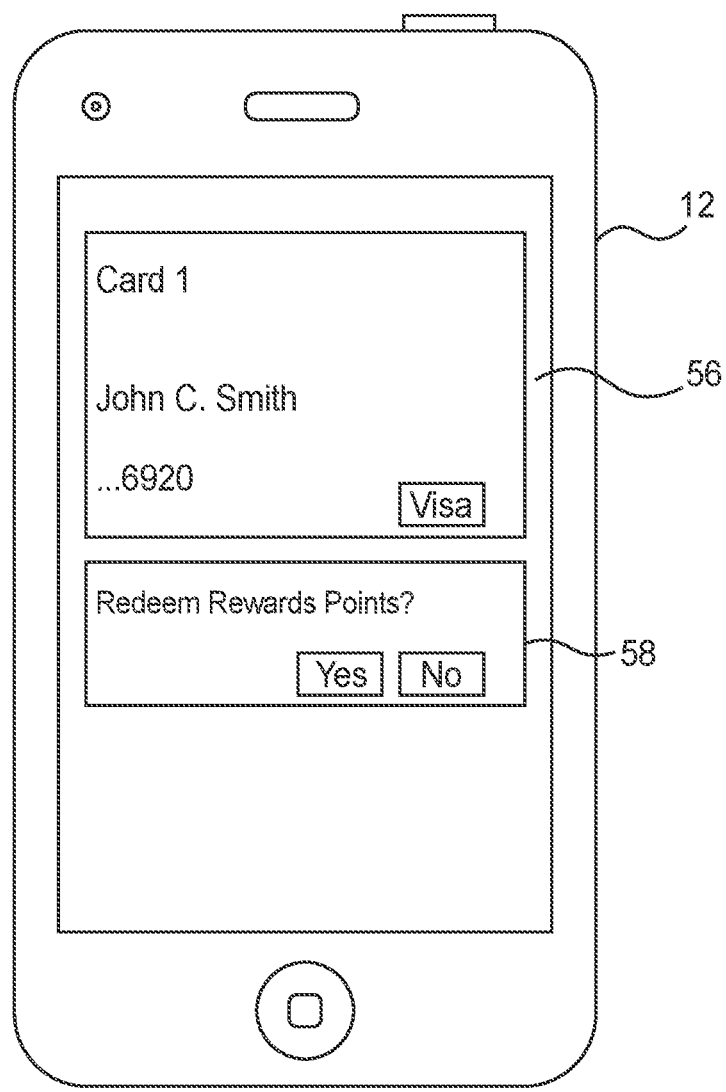
FIG. 7 shows a schematic of a graphical user interface for prompting a user to indicate whether rewards amount is to be redeemed, according to some non-limiting embodiments or aspects.

Referring to FIG. 7, FIG. 7 shows a graphical user interface 56 for prompting a user and allowing the user to indicate whether rewards amount is to be redeemed according to some non-limiting embodiments or aspects. For example, communicating the redemption request may include the user device 12 receiving an input from the user to indicate that the payment transaction is to be processed using at least a portion of the rewards amount. The user may indicate via a rewards redemption prompt 58 on the graphical user interface 56 that a rewards amount associated with the virtual payment device is to be applied for the payment transaction or is not to be applied to the payment transaction. The user may also input into the user device 12 a rewards amount associated with the virtual payment device to be applied to the payment transaction. For example, the user may indicate that an entire rewards amount is to be applied or only a specified portion thereof is to be applied. The graphical user interface 56 for prompting a user and allowing the user to indicate whether rewards amount is to be redeemed may use any suitable arrangement.

Referring again to FIG. 1, in response to the TSP rewards system 26 receiving the redemption request, the TSP rewards system 26 may communicate the redemption request to the issuer rewards system 28a-28c associated with the issuer associated with the virtual payment device used to initiate the payment transaction. The issuer rewards system 28a-28c may process the redemption request by applying the rewards amount to the payment transaction. In some non-limiting embodiments or aspects, applying the rewards amount to the payment transaction may include the rewards amount being applied to the transaction amount associated with the payment transaction during processing of the payment transaction. Additionally or alternatively, the rewards amount may be applied to the payment transaction prior to authorization of the payment transaction by the corresponding issuer system 24a-24c, e.g., to reduce the transaction amount being authorized by the rewards amount. In some non-limiting embodiments or aspects, the rewards amount may be applied to the payment transaction during settlement of the payment transaction. For example, the issuer may give the user statement credit for the rewards amount. It will be appreciated that the rewards amount may be applied at other stages during or after processing of the payment transaction.

With continued reference to FIG. 1, the issuer rewards system 28a-28c may communicate a redemption response to the TSP rewards system 26 e.g., to notify TSP rewards system 26 and/or the user that the rewards amount in the redemption request has been, is being, or will be applied to the payment transaction. The TSP rewards system 26 may communicate this redemption response to the e-wallet application 14 on the user device 12. The redemption response may further include an updated rewards amount associated with the virtual payment device used to initiate the payment transaction. The updated rewards amount may include a difference between the rewards amount originally available for the virtual payment device and the portion of the rewards amount applied toward the payment transaction.

Figure 8:
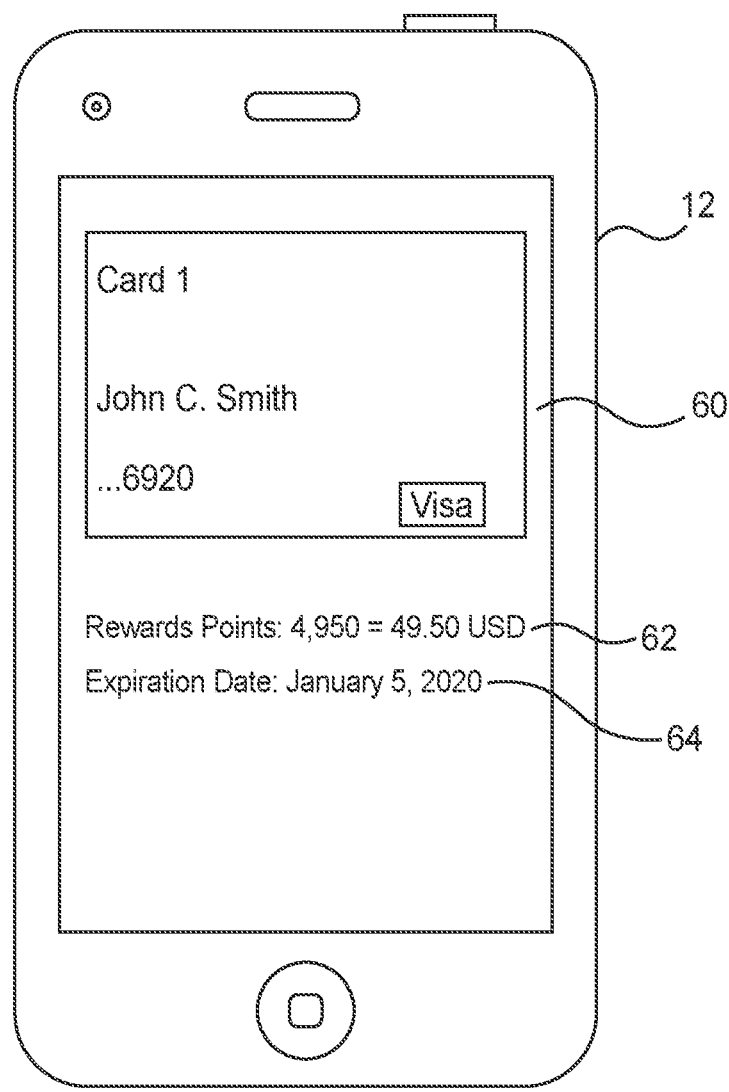
FIG. 8 shows a schematic of a graphical user interface for displaying updated payment device information in an electronic wallet application, according to some non-limiting embodiments or aspects.

As shown in FIG. 8, FIG. 8 shows a graphical user interface 60 for displaying updated payment device information in the e-wallet application 14 according to some non-limiting embodiments or aspects. The user device 12 may show the updated rewards amount in the e-wallet application 14. The updated payment device information may include an updated rewards amount 62, such as in rewards points and/or in corresponding monetary currency. The updated payment device information may also include updated expiration date information 64 indicating at least one date on which at least a portion of the updated rewards amount 62 expires. The graphical user interface 60 for displaying updated payment device information may use any suitable arrangement for displaying updated payment device information.

Figure 9:
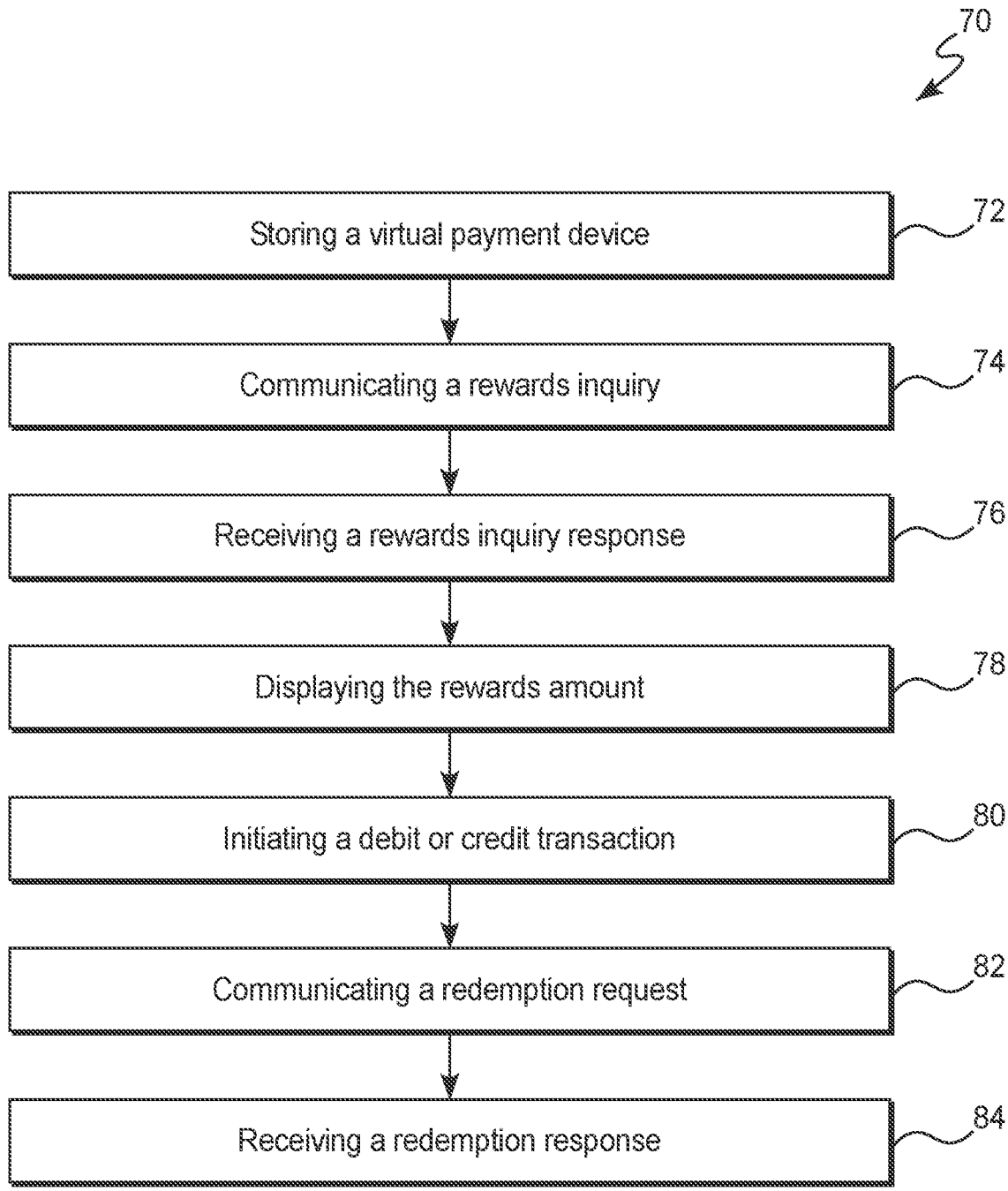
FIG. 9 shows a step diagram of a method for processing a transaction initiated using an electronic wallet application, according to some non-limiting embodiments or aspects.

Referring to FIG. 9, a method 70 for processing a transaction initiated using an e-wallet application 14 (see FIG. 1) according to some non-limiting embodiments or aspects is shown. Steps of the method 70 may be performed by the components shown in FIG. 1.

At step 72, the e-wallet application 14 may cause the user device 12 to store the at least one virtual payment device associated with a payment device issued to the user by the issuer system 24a-24c (see FIG. 1). The at least one virtual payment device may be configured to initiate at least one of a debit transaction, a credit transaction, and/or the like. The virtual payment device may be stored in the e-wallet application 14 as a token different from the account identifier assigned by the issuer to the payment device. The virtual payment device may be received from the enrollment system 42, which may be stored in the e-wallet application 14.

At step 74, the e-wallet application 14 may cause the user device 12 to communicate the rewards inquiry to the issuer rewards system 28a-28c of the issuer (e.g., through the TSP rewards system 26 (see FIG. 1)). Communicating the rewards inquiry may include communicating a first rewards inquiry to the TSP rewards system 26 associated with the at least one virtual payment device according to a first application programming interface, where the first rewards inquiry causes the TSP rewards system 26 to generate and communicate a second rewards inquiry to the issuer rewards system 28a-28c according to a second application programming interface. The first rewards inquiry may include the token, and the second rewards inquiry may include the account identifier, where generating the second rewards inquiry may include replacing the token of the first rewards inquiry with the account identifier to form the second rewards inquiry.

At step 76, the e-wallet application 14 may cause the user device 12 to receive the rewards inquiry response from the issuer rewards system 28a-28c. The rewards inquiry response may contain a rewards amount associated with the at least one virtual payment device.

At step 78, the e-wallet application 14 may cause the user device 12 to display the rewards amount associated with the at least one virtual payment device.

At step 80, the e-wallet application 14 may cause the user device 12 to initiate the debit or credit (payment transaction) transaction for a transaction amount with the merchant system 20 (see FIG. 1) using the at least one virtual payment device.

At step 82, the e-wallet application 14 may cause the user device 12 to communicate the redemption request to the issuer rewards system 28a-28c. The redemption request may specify at least a portion of the rewards amount to be applied to the debit or credit transaction by a user communicating an input indicating that the debit transaction, credit transaction, and/or the like is to be processed using at least portion of the rewards amount.

At step 84, the e-wallet application 14 may cause the user device 12 to receive a redemption response comprising an updated rewards amount from the issuer rewards system 28a-28c. The updated rewards amount may include a difference between the rewards amount and the at least the portion of the rewards amount applied toward the debit or credit transaction. The issuer system may credit an account of the user with at least a portion of the rewards amount to be applied to the debit or credit transaction during settlement of the payment transaction.

In some non-limiting embodiment or aspects, a computer program product for processing a transaction initiated using an electronic wallet application includes at least one non-transitory computer readable medium including program instructions that, when executed by at least one processor, cause the at least one processor to execute any of the previously-described systems and/or methods. For example, the user device 12 on which the e-wallet application 14 is downloaded or installed may include the at least one processor.

Figure 11:
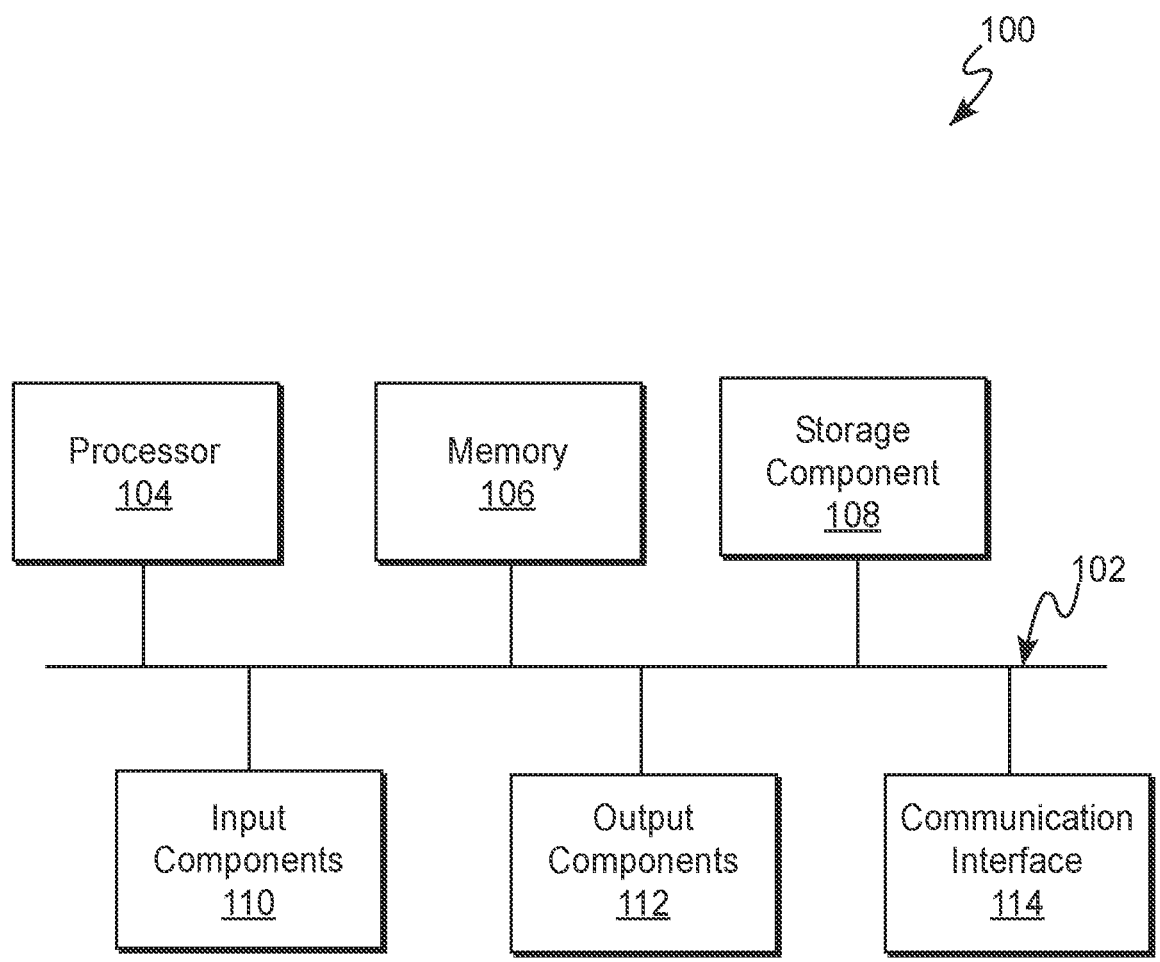
FIG. 11 shows a diagram of a non-limiting embodiment of components of one or more devices of the system of FIGS. 1, 3, and 5.

Referring to FIG. 11, FIG. 11 is a diagram of example components of a device 100. Device 100 may correspond to one or more devices of the systems shown in FIGS. 1, 3, and 5. In some non-limiting embodiments, any of the devices shown in FIGS. 1, 3, and 5 (e.g., the user device 12) may include at least one device 100 and/or at least one component of device 100. As shown in FIG. 11, device 100 may include bus 102, processor 104, memory 106, storage component 108, input component 110, output component 112, and communication interface 114.

Bus 102 may include a component that permits communication among the components of device 100. In some non-limiting embodiments, processor 104 may be implemented in hardware, firmware, or a combination of hardware and software. For example, processor 104 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 106 may include random access memory (RAM), read only memory (ROM), and/or another type of dynamic or static storage device (e.g., flash memory, magnetic memory, optical memory, and/or the like) that stores information and/or instructions for use by processor 104.

Storage component 108 may store information and/or software related to the operation and use of device 100. For example, storage component 108 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 110 may include a component that permits device 100 to receive information, such as via user input (e.g., a touch screen display, a keyboard, a keypad, a mouse, a button, a switch, a microphone, a camera, and/or the like). Additionally or alternatively, input component 110 may include a sensor for sensing information (e.g., a global positioning system (GPS) component, an accelerometer, a gyroscope, an actuator, and/or the like). Output component 112 may include a component that provides output information from device 100 (e.g., a display, a speaker, one or more light-emitting diodes (LEDs), and/or the like).

Communication interface 114 may include a transceiver-like component (e.g., a transceiver, a receiver and transmitter that are separate, and/or the like) that enables device 100 to communicate with other devices, such as via a wired connection, a wireless connection, or a combination of wired and wireless connections. Communication interface 114 may permit device 100 to receive information from another device and/or provide information to another device. For example, communication interface 114 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 100 may perform one or more processes described herein. Device 100 may perform these processes based on processor 104 executing software instructions stored by a computer-readable medium, such as memory 106 and/or storage component 108. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 106 and/or storage component 108 from another computer-readable medium or from another device via communication interface 114. When executed, software instructions stored in memory 106 and/or storage component 108 may cause processor 104 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 11 are provided as an example. In some non-limiting embodiments or aspects, device 100 may include additional components, fewer components, different components, or differently arranged components than those shown in FIG. 11. Additionally or alternatively, a set of components (e.g., one or more components) of device 100 may perform one or more functions described as being performed by another set of components of device 100.

The following example is provided to illustrate an embodiment of the system, method, and computer program product for processing a transaction initiated using an e-wallet application 14, and is not meant to be limiting.

Figure 10:
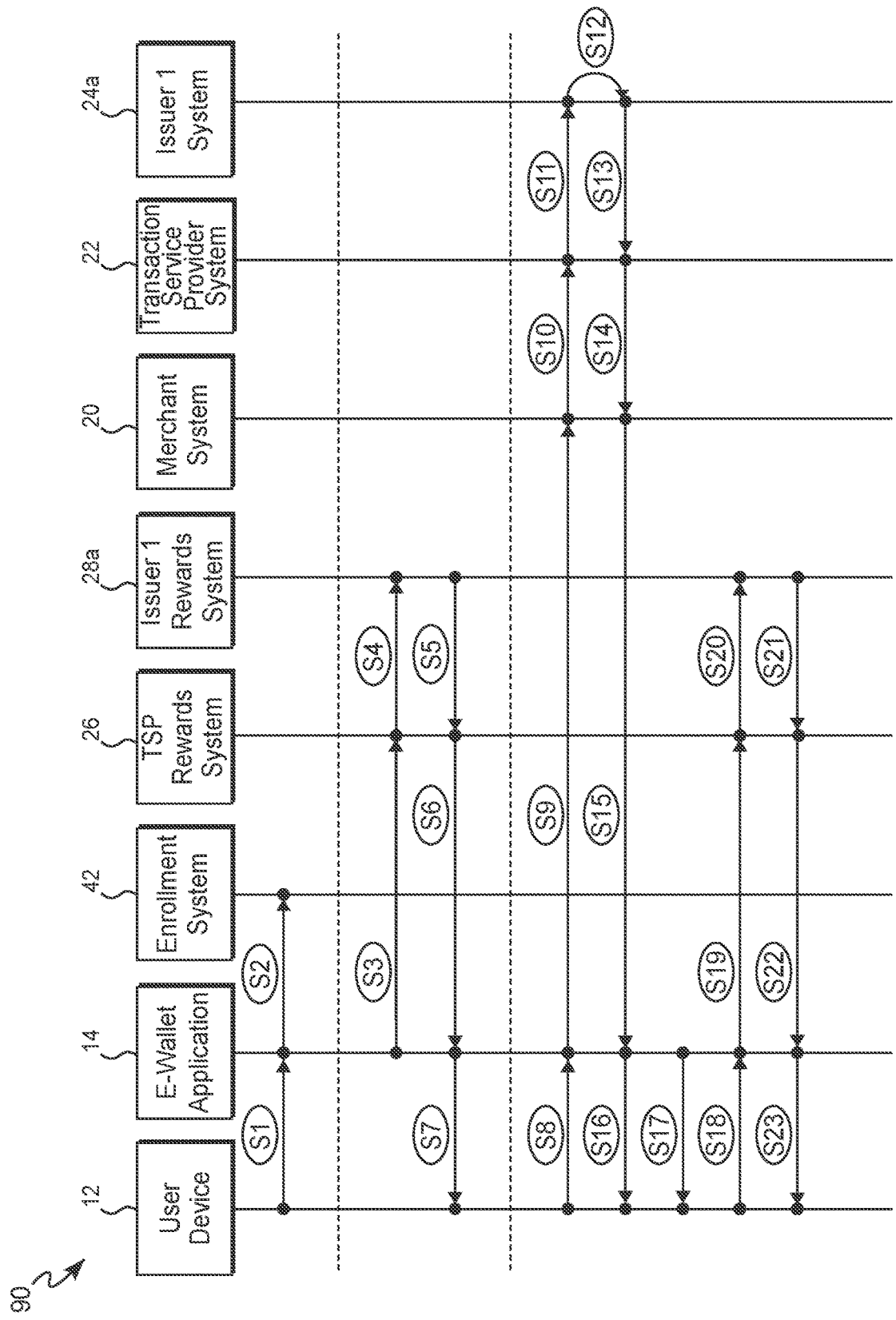
FIG. 10 shows a process flow diagram of a method for processing a transaction initiated using an electronic wallet application, according to some non-limiting embodiments or aspects.

Referring to FIG. 10, a method 90 for processing a transaction initiated using an e-wallet application 14 is shown according to some non-limiting embodiments or aspects. For example, a user may use a user device 12 (e.g., smartphone) having downloaded thereon an e-wallet application 14 capable of initiating payment transactions.

At step S1, the user device 12 may store a payment device as a virtual payment device on the e-wallet application 14, e.g., based on the user entering payment device information into the user device 12. The payment device may be associated with a transaction service provider and/or an issuer. For example, the payment device may have been issued to the by an issuer bank.

At step S2, the e-wallet application 14 may communicate with an enrollment system 42 of the transaction service provider to enroll the payment device with the e-wallet application 14, such as by confirming that the payment device is associated with or issued to the user. Additionally or alternatively, the transaction service provider, via the enrollment system 42, may also provide supplemental virtual payment device information associated with the payment device (e.g., a token to store in lieu of a PAN) and/or provide additional virtual payment devices issued to the user to the e-wallet application 14.

At step S3, the e-wallet application 14 may communicate a first rewards inquiry to a TSP rewards system 26 of the transaction service provider to inquire regarding the available rewards amount associated with the virtual payment device.

At step S4, the TSP rewards system 26 may communicate a second rewards inquiry including at least a portion of the first rewards inquiry to the issuer 1 rewards system 28a associated with the issuer, e.g., upon the TSP rewards system 26 determining the issuer bank associated with the virtual payment device.

At step S5, the issuer 1 rewards system 28a may communicate a rewards inquiry response to the TSP rewards system 26, and the rewards inquiry response may include an available rewards amount associated with the virtual payment device.

At step S6, the TSP rewards system 26 may communicate the rewards inquiry response, which may include the available rewards amount to the e-wallet application 14. At step S7, the e-wallet application 14 may cause the user device 12 to display the rewards amount associated with the virtual payment device. For example, referring to FIG. 6, the virtual payment device issued to the user has 10,000 rewards points, corresponding to $100 USD, which expire on Jan. 5, 2020.

At step S8, the user may select the virtual payment device to be used to initiate a payment transaction with a merchant for goods from the merchant by selecting the virtual payment device in the e-wallet application 14 of the user device 12.

At step S9, the e-wallet application 14 may initiate the payment transaction with the merchant by communicating with a merchant system 20 of the merchant. For example, the user device 12 on which the e-wallet application 14 is downloaded may be moved in the vicinity of the merchant system 20 (e.g., a merchant POS device) to enable communication therebetween. The e-wallet application 14 may communicate account information associated with the virtual payment device, such that the virtual payment device is the payment device used to process the payment transaction.

At step S10, in response to the e-wallet application 14 initiating a payment transaction with the merchant system 20, the merchant system 20 may initiate processing of the payment transaction by communicating a transaction message to the transaction service provider system 22 (e.g., directly or via an acquirer). The transaction service provider system 22 may be operated by or on behalf of the transaction service provider. The transaction message (e.g., first authorization request) may include the account information associated with the virtual payment device (e.g., PAN or token associate therewith, cardholder name, expiration date, cvv code, and the like), as well as other information relevant for processing the payment transaction.

At step S11, the transaction service provider system 22 may communicate an authorization request including at least a portion of the transaction message to the issuer 1 system 24a operated by or on behalf of the issuer.

With continued reference to FIG. 10, at step S12, the issuer 1 system 28a may determine an authorization decision associated with the payment transaction (e.g., approve, decline, some combination thereof, and/or the like). For example, the issuer 1 system 28a may determine that the authorization decision is to approve the payment transaction.

At step S13, the issuer 1 system 28a may communicate the authorization response including the authorization decision (e.g., to approve the payment transaction) to the transaction service provider system 22. At step S14, the transaction service provider system 22 may communicate a transaction response including the authorization decision to the merchant system 20 (e.g., directly or via an acquirer).

At step S15, the merchant system 20 may communicate the authorization decision to the e-wallet application 14. At step S16, the e-wallet application 14 may cause the user device 12 to display for the user that the payment transaction is approved.

With continued reference to FIG. 10, and at some point during processing of the payment transaction (e.g., prior to the authorization decision, during settlement of the payment transaction, etc.), at step S17, the e-wallet application 14 may cause a graphical user interface for prompting a user to indicate whether the rewards amount (or a portion thereof) is to be redeemed to be displayed on the user device 12 (see e.g., FIG. 7). At step S18, the user may input into the graphical user interface displayed by the user device 12 (e.g., in the e-wallet application 14) that at least a portion of the rewards amount available for the virtual payment device is to be applied to the payment transaction.

At a step S19, the e-wallet application 14 may communicate a redemption request to the TSP rewards processor 26. The redemption request may include the rewards amount or portion thereof indicated to be used by the user.

At step S20, the TSP rewards processor 26 may communicate the redemption request to the issuer 1 rewards system 28a. Issuer 1 rewards system 28a may process the redemption request by applying the requested rewards amount to the payment transaction.

At step S21, the issuer 1 rewards system 28a may communicate to the TSP rewards system 26 a redemption response including an updated rewards amount available for the virtual payment device after application of the requested rewards amount to the payment transaction. At step S22, the TSP rewards system 26 may communicate the rewards response including the updated rewards amount to the e-wallet application 14.

At step S23, the e-wallet application 14 may cause the updated rewards amount to be displayed by the user device 12 (see FIG. 8). For example, as shown in FIG. 8, a $50.50 rewards amount (5050 rewards points) associated with the virtual payment device was applied to the payment transaction, such that $49.50 remains as the rewards amount (4950 rewards points) available for the virtual payment device. The updated rewards amount may be used by the user towards future payment transactions initiated using the virtual payment device.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for processing a transaction initiated using an electronic wallet application, comprising:
   determining a rewards amount associated with at least one virtual payment device by communicating between a user device of a user and a rewards management system comprising a transaction service provider system of a transaction service provider and an issuer reward system of an issuer and not comprising a merchant system of a merchant with which payment transactions may be initiated using the at least one virtual payment device, wherein the user device comprises an electronic wallet application storing the at least one virtual payment device of the user issued to the user by the issuer of an issuer system, wherein the transaction service provider system is associated with the at least one virtual payment device, wherein determining the rewards amount associated with the at least one virtual payment device comprises:
      receiving, by the transaction service provider system, a first rewards inquiry from the electronic wallet application of the user device according to a first application programming interface;
      transmitting, by the transaction service provider system, at least a portion of the first rewards inquiry to the issuer reward system according to a second application programming interface;
      receiving, by the transaction service provider system, a rewards inquiry response containing a rewards amount associated with the at least one virtual payment device from the issuer reward system according to the second application programming interface; and
      transmitting, by the transaction service provider system, at least a portion of the rewards inquiry response to the user device according to the first application programming interface to cause the rewards amount associated with the at least one virtual payment device to be displayed in the electronic wallet application;
   processing a payment transaction by communicating between the user device and an electronic payment processing network separate from the rewards management system, wherein the electronic payment processing network comprises the merchant system, the transaction service provider system, and the issuer system, wherein processing the payment transaction comprises:
      in response to the electronic wallet application initiating the payment transaction, receiving, by the transaction service provider system, an authorization request message;
      transmitting, by the transaction service provider system, at least a portion of the authorization request message to the issuer system;
      receiving, by the transaction service provider system, an authorization response message containing an authorization decision from the issuer system; and
      transmitting, by the transaction service provider system, at least a portion of the authorization response message to the user device; and
   redeeming a reward amount regardless of the merchant system by communicating between the user device and the rewards management system, wherein redeeming the reward amount comprises:
      during processing of the payment transaction, receiving, by the transaction service provider system and from the electronic wallet application of the user device, a redemption request specifying a portion of the rewards amount to be applied to the payment transaction; and
      transmitting, by the transaction service provider system, at least a portion of the redemption request to the issuer system to apply the portion of the rewards amount to the payment transaction.

2. The method of claim 1, wherein the issuer of the issuer reward system and the issuer of the issuer system is a same issuer, wherein the same issuer is the issuer of the at least one virtual payment device.

3. The method of claim 1, wherein the transaction service provider system determines the issuer reward system from a plurality of issuer rewards systems in response to receiving the first rewards inquiry.

4. The method of claim 1, wherein the transaction service provider system determines the issuer system from a plurality of issuer systems in response to receiving the authorization request message.

5. The method of claim 1, wherein the at least one virtual payment device is stored in the electronic wallet application as a token, wherein the token is different from an account identifier assigned by the issuer system to a payment device corresponding to the at least one virtual payment device.

6. The method of claim 5, wherein the first rewards inquiry comprises the token and the at least a portion of the first rewards inquiry comprises the account identifier, wherein generating the at least a portion of the first rewards inquiry comprises replacing the token of the first rewards inquiry with the account identifier to form the at least a portion of the first rewards inquiry.

7. The method of claim 1, wherein the issuer system credits an account of the user with the at least the portion of the rewards amount to be applied to the payment transaction during settlement of the payment transaction.

8. A system for processing a transaction initiated using an electronic wallet application, comprising at least one processor programmed or configured to:
   determine a rewards amount associated with at least one virtual payment device by communicating between a user device of a user and a rewards management system comprising a transaction service provider system of a transaction service provider and an issuer reward system of an issuer and not comprising a merchant system of a merchant with which payment transactions may be initiated using the at least one virtual payment device, wherein the user device comprises an electronic wallet application storing the at least one virtual payment device of the user issued to the user by the issuer of an issuer system, wherein the transaction service provider system is associated with the at least one virtual payment device, wherein determining the rewards amount associated with the at least one virtual payment device comprises:

receiving, by the transaction service provider system, a first rewards inquiry from the electronic wallet application of the user device according to a first application programming interface;

transmitting, by the transaction service provider system, at least a portion of the first rewards inquiry to the issuer reward system according to a second application programming interface;

receiving, by the transaction service provider system, a rewards inquiry response containing a rewards amount associated with the at least one virtual payment device from the issuer reward system according to the second application programming interface; and transmitting, by the transaction service provider system, at least a portion of the rewards inquiry response to the user device according to the first application programming interface to cause the rewards amount associated with the at least one virtual payment device to be displayed in the electronic wallet application;

process a payment transaction by communicating between the user device and an electronic payment processing network separate from the rewards management system, wherein the electronic payment processing network comprises the merchant system, the transaction service provider system, and the issuer system, wherein processing the payment transaction comprises:

in response to the electronic wallet application initiating the payment transaction, receiving, by the transaction service provider system, an authorization request message;

transmitting, by the transaction service provider system, at least a portion of the authorization request message to the issuer system;

receiving, by the transaction service provider system, an authorization response message containing an authorization decision from the issuer system; and transmitting, by the transaction service provider system, at least a portion of the authorization response message to the user device; and redeem a reward amount regardless of the merchant system by communicating between the user device and the rewards management system, wherein redeeming the reward amount comprises:

during processing of the payment transaction, receiving, by the transaction service provider system and from the electronic wallet application of the user device, a redemption request specifying a portion of the rewards amount to be applied to the payment transaction; and transmitting, by the transaction service provider system, at least a portion of the redemption request to the issuer system to apply the portion of the rewards amount to the payment transaction.

9. The system of claim 8, wherein the issuer of the issuer reward system and the issuer of the issuer system is a same issuer, wherein the same issuer is the issuer of the at least one virtual payment device.

10. The system of claim 8, wherein the transaction service provider system determines the issuer reward system from a plurality of issuer rewards systems in response to receiving the first rewards inquiry.

11. The system of claim 8, wherein the transaction service provider system determines the issuer system from a plurality of issuer systems in response to receiving the authorization request message.

12. The system of claim 8, wherein the at least one virtual payment device is stored in the electronic wallet application as a token, wherein the token is different from an account identifier assigned by the issuer system to a payment device corresponding to the at least one virtual payment device.

13. The system of claim 12, wherein the first rewards inquiry comprises the token and the at least a portion of the first rewards inquiry comprises the account identifier, wherein generating the at least a portion of the first rewards inquiry comprises replacing the token of the first rewards inquiry with the account identifier to form the at least a portion of the first rewards inquiry.

14. The system of claim 8, wherein the issuer system credits an account of the user with the at least the portion of the rewards amount to be applied to the payment transaction during settlement of the payment transaction.

15. A computer program product for processing a transaction initiated using an electronic wallet application, the computer program product comprising at least one non-transitory computer-readable medium including one or more instructions that, when executed by at least one processor, cause the at least one processor to:

determine a rewards amount associated with at least one virtual payment device by communicating between a user device of a user and a rewards management system comprising a transaction service provider system of a transaction service provider and an issuer reward system of an issuer and not comprising a merchant system of a merchant with which payment transactions may be initiated using the at least one virtual payment device, wherein the user device comprises an electronic wallet application storing the at least one virtual payment device of the user issued to the user by the issuer of an issuer system, wherein the transaction service provider system is associated with the at least one virtual payment device, wherein determining the rewards amount associated with the at least one virtual payment device comprises:

receiving, by the transaction service provider system, a first rewards inquiry from the electronic wallet application of the user device according to a first application programming interface;

transmitting, by the transaction service provider system, at least a portion of the first rewards inquiry to the issuer reward system according to a second application programming interface;

receiving, by the transaction service provider system, a rewards inquiry response containing a rewards amount associated with the at least one virtual payment device from the issuer reward system according to the second application programming interface; and transmitting, by the transaction service provider system, at least a portion of the rewards inquiry response to the user device according to the first application programming interface to cause the rewards amount associated with the at least one virtual payment device to be displayed in the electronic wallet application;

process a payment transaction by communicating between the user device and an electronic payment processing network separate from the rewards management system, wherein the electronic payment processing network comprises the merchant system, the transaction service provider system, and the issuer system, wherein processing the payment transaction comprises:

in response to the electronic wallet application initiating the payment transaction, receiving, by the transaction service provider system, an authorization request message;

transmitting, by the transaction service provider system, at least a portion of the authorization request message to the issuer system;

receiving, by the transaction service provider system, an authorization response message containing an authorization decision from the issuer system; and transmitting, by the transaction service provider system, at least a portion of the authorization response message to the user device; and redeem a reward amount regardless of the merchant system by communicating between the user device and the rewards management system, wherein redeeming the reward amount comprises:

during processing of the payment transaction, receiving, by the transaction service provider system and from the electronic wallet application of the user device, a redemption request specifying a portion of the rewards amount to be applied to the payment transaction; and transmitting, by the transaction service provider system, at least a portion of the redemption request to the issuer system to apply the portion of the rewards amount to the payment transaction.

16. The computer program product of claim 15, wherein the issuer of the issuer reward system and the issuer of the issuer system is a same issuer, wherein the same issuer is the issuer of the at least one virtual payment device.

17. The computer program product of claim 15, wherein the transaction service provider system determines the issuer reward system from a plurality of issuer rewards systems in response to receiving the first rewards inquiry.

18. The computer program product of claim 15, wherein the transaction service provider system determines the issuer system from a plurality of issuer systems in response to receiving the authorization request message.

19. The computer program product of claim 15, wherein the at least one virtual payment device is stored in the electronic wallet application as a token, wherein the token is different from an account identifier assigned by the issuer system to a payment device corresponding to the at least one virtual payment device.

20. The computer program product of claim 19, wherein the first rewards inquiry comprises the token and the at least a portion of the first rewards inquiry comprises the account identifier, wherein generating the at least a portion of the first rewards inquiry comprises replacing the token of the first rewards inquiry with the account identifier to form the at least a portion of the first rewards inquiry.

* * * * *